J. M. LOW.
Horse Tedder.
N° 70870. Patented Nov. 12 1867.

Witnesses
Thos Insche
W<sup>m</sup> Trewin

Inventor
J M Low
Per Munn & Co
Attorneys

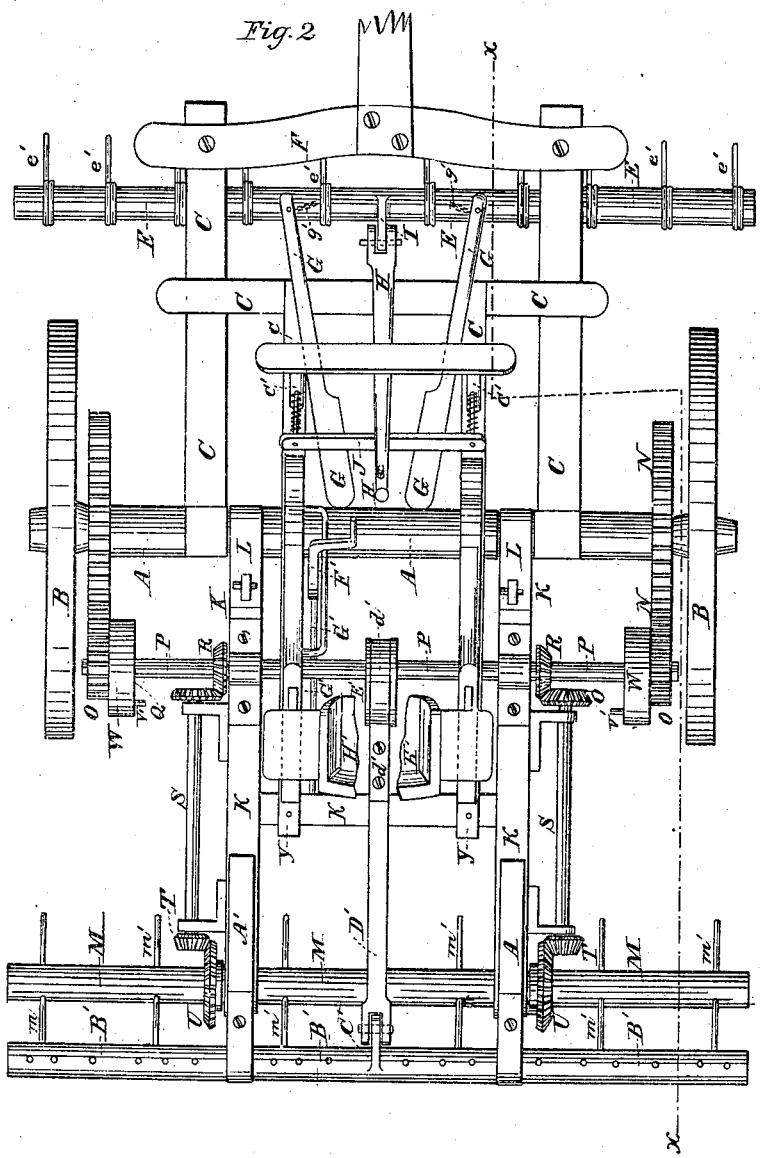

United States Patent Office.

J. M. LOW, OF PORTLANDVILLE, NEW YORK.

Letters Patent No. 70,870, dated November 12, 1867.

---

IMPROVEMENT IN HORSE-RAKES AND HAY-SPREADERS COMBINED.

---

*The Schedule referred to in these Letters Patent and making part of the same.*

---

TO ALL WHOM IT MAY CONCERN:

Be it known that I, J. M. Low, of Portlandville, in the county of Otsego, and State of New York, have invented a new and improved Hay-Rake and Tedder; and I do hereby declare that the following is a full, clear, and exact description thereof, which will enable those skilled in the art to make and use the same, reference being had to the accompanying drawings, forming part of this specification, in which—

Figure 2 is a top or plan view of the same.

Similar letters of reference indicate corresponding parts.

Figure 1:
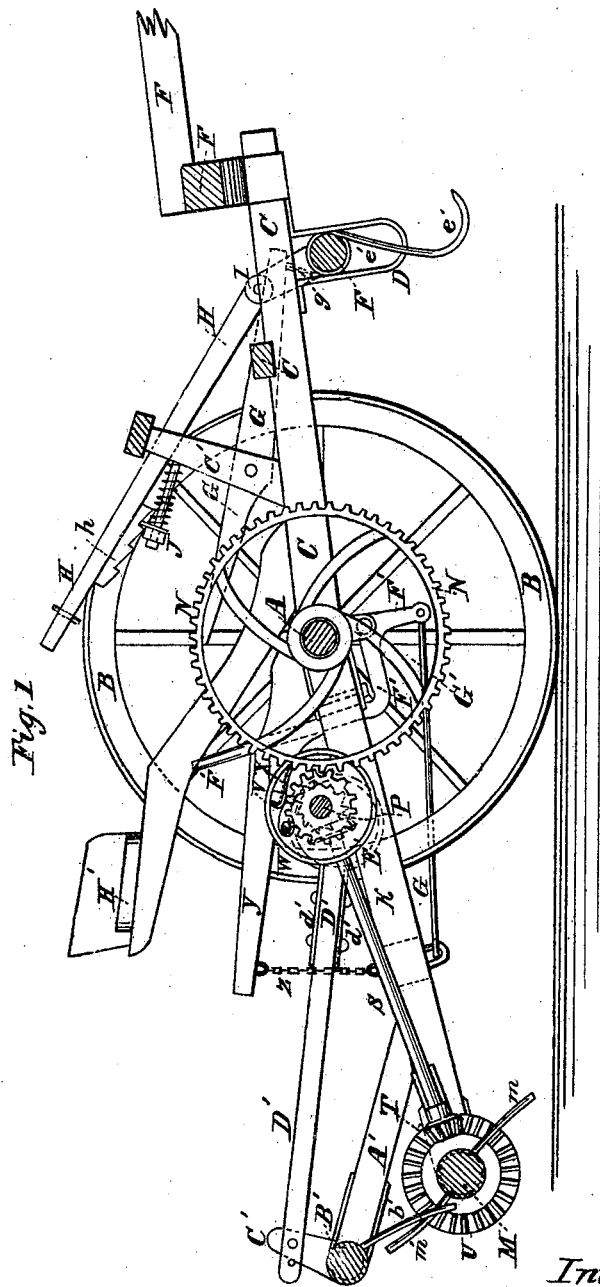
Figure 1 is a detail sectional view of my improved machine, taken through the line $x\ x$, fig. 2.

My invention has for its object to furnish an improved attachment for hay-rakes, by means of which hay may be shaken out and stirred up, or turned quickly, conveniently, and thoroughly; and it consists in the combination of the revolving-shaft or stirrer and its supporting-frame with the axle and frame of the rake; in the combination of the shafts and gearing by which the stirrer-shaft is operated with the frame and drive-wheels of the machine; in the combination of the toothed reciprocating clearer-shaft with the revolving stirrer-shaft and frame of the machine; in the combination of the eccentric, or its equivalent, and pitman with the reciprocating and drive-shafts; and in the combination of the bent lever and connecting-rod with the tedder-frame and axle, or frame of the rake, the whole being constructed and arranged as hereinafter more fully described.

A is the axle, and B are the wheels of the machine. C is the rake-frame, which is securely attached to the axle A, and to the forward part of which are attached the yokes D, in which the rake-head or shaft E is hung. F is the tongue, which is detachably secured to the forward end of the frame C, so that it may be removed and replaced with a pair of thills when desired. $e'$ are the rake-teeth, which are attached to the shaft E in the ordinary manner. G are levers, the forward ends of which are connected to the rake-shaft E by the short chains $g'$, the middle parts of which are pivoted to the standards $c'$, and the rear ends of which extend back into such a position that they may be operated by the driver with his feet to raise the rake in passing over obstructions. H is an arm or rod, the forward end of which is pivoted to the short arm I, rigidly attached to the shaft E. Upon the under side of the rear part of the rod or bar H is secured a rack-plate, $h'$, the teeth of which take hold of a catch-plate attached to the spring-bar J to hold the rake-head in any position in which it may be placed, so that, should the rake-teeth strike an obstruction, the said bar may give to prevent the rake from being broken. K is the tedder-frame, the forward ends of the side bars of which are attached to the axle A by hinged straps L, fitting into grooves formed in said axle, and secured in place by keys or spring-catches. This allows the rear end of the tedder to be raised or lowered as required, and also allows the tedder to be quickly detached from the said axle. M is a shaft, revolving in bearings attached to the rear ends of the side bars of the frame K, and having teeth $m'$ projecting from its opposite sides, as shown in figs. 1 and 2. N are gear-wheels, formed upon or attached to the hubs of the drive-wheels B, and the teeth of which mesh into the teeth of the pinion-wheels O, attached to the ends of the shaft P. The shaft P revolves in bearings in the frame K of the tedder, and has one or more bevel-gear wheels R attached to it, into the teeth of which mesh the teeth of the bevel-gear wheel or wheels Q, attached to the shaft or shafts S, which revolve in bearings in the frame K, and have a bevel-gear wheel, T, attached to their rear ends, the teeth of which mesh into the teeth of the bevel-gear wheels U, attached to the tedder-shaft M, so that the said tedder-shaft may be revolved by the revolution of the drive-wheels B. The gear-wheels O are loosely attached to the shaft P, so that they may revolve freely upon it; and they are made to carry it with them when the machine is drawn forward by the pawls V, pivoted to and within the caps W, and which take hold of ratchet-teeth formed upon or attached to the said shaft P. The pawls V are held down against the ratchet-teeth by the springs X, which are attached to the caps W in such positions as to hold the pawls down to their work when they are in contact with the ratchet-teeth, and also to hold them in place by pressing against their ends when raised from the said ratchet-teeth. The pawls V are raised or lowered, to throw the tedder out of or into gear with the drive-wheels, by means of the short arms $v'$, projecting through a slot in the caps W. Y are standards attached to the rake-frame C, from the rear ends of which hang chains Z, connecting with eye-bolts or rings attached to the frame K, so that the tedder may be held at any desired height while being operated or transported from place to place.

A' are standards attached to the frame K, in bearings upon the rear ends of which work the clearer-shaft B', having teeth b' projecting from its under side. To the upper side of the shaft B' is rigidly attached a short arm, C', to which is pivoted the end of the pitman D', the other end of which rides upon the eccentric-wheel E', attached to the shaft P, being kept in place thereon by the strap d', passing around said wheel, and secured to the said pitman, so that, by the revolution of the shaft P, a reciprocating movement is communicated to the clearer B'. The gearing R Q T U is so formed that the clearer B' may move twice in each direction at each revolution of the tedder-shaft M; and it is so arranged that, as each set of teeth m' rise above a horizontal position, the clearer-teeth b' may begin to move outward from the shaft M, so as to sweep the hay from the teeth m', throwing it upward and rearward.

If desired, the eccentric E' may be replaced by a crank formed upon the said shaft P. The gearing U T should be covered with a cap to prevent the hay from clogging it. F' is a bent lever, the middle part of which is pivoted to the axle A or frame C; and to its lower end is pivoted the end of a connecting-rod, G, the other end of which is pivoted to the frame K. The upper end of the lever F' extends up into such a position that it can be reached and operated by the driver from his seat H to enable the tedder to pass over obstructions.

*Claim.*

I claim as new, and desire to secure by Letters Patent—

1. The arrangement of the revolving toothed shaft M, and its supporting-frame K, the axle A, and frame C of the rake, substantially as herein shown and described and for the purpose set forth.

2. The combination of the gear-wheels N and O, shaft P, gear-wheels Q and R, one or more shafts S, and the gear-wheels T and U, with each other, and with the drive-wheels B, frame K, and tedder-shaft M, substantially as herein shown and described and for the purpose set forth.

3. The combination of the toothed reciprocating clearer-shaft B' with the revolving toothed tedder-shaft M and with the frame K, substantially as herein shown and described and for the purpose set forth.

4. Operating the reciprocating clearer-shaft B' from the shaft P by means of the eccentric-wheel E', or its equivalent, and the pitman D', substantially as herein shown and described and for the purpose set forth.

J. M. LOW.

Witnesses:
   O. M. SOULE,
   J. W. CRONKIT.